United States Patent [19]

Akiyama et al.

[11] Patent Number: 4,880,659

[45] Date of Patent: Nov. 14, 1989

[54] PROCESSING TOFU OR DOUGH FOR PROCESSED TOFU TO RESULT IN MEAT-LIKE TEXTURE

[75] Inventors: Yoshinobu Akiyama, Hidakamachi; Sakashi Yoshihashi, Higashikurume; Iwao Sakauchi, Higashimurayama, all of Japan

[73] Assignee: Kyodo Milk Industry Co., Ltd., Tokyo, Japan

[21] Appl. No.: 202,680

[22] Filed: Jun. 6, 1988

Related U.S. Application Data

[63] Continuation-in-part of Ser. No. 878,319, Jun. 25, 1986, abandoned.

[30] Foreign Application Priority Data

Jul. 6, 1985 [JP] Japan .................................. 60-147656

[51] Int. Cl.$^4$ ............................. A23J 3/00; A23L 1/20
[52] U.S. Cl. ..................................... 426/656; 426/634; 426/516; 426/518
[58] Field of Search ................. 426/518, 634, 656, 516

[56] References Cited

U.S. PATENT DOCUMENTS

| 3,970,076 | 7/1976 | Wenger et al. | 426/656 X |
| 4,204,005 | 5/1980 | Kudo et al. | 426/518 |
| 4,369,195 | 1/1983 | Nelson et al. | 426/634 X |
| 4,517,218 | 5/1985 | Gackel et al. | 426/656 |
| 4,579,749 | 4/1986 | Ishizuka et al. | 426/634 X |
| 4,585,665 | 4/1986 | Sugisawa et al. | 426/656 X |

FOREIGN PATENT DOCUMENTS

| 0199350 | 10/1985 | Japan | 426/634 |
| 1429111 | 3/1976 | United Kingdom | 426/656 |

*Primary Examiner*—Joseph Golian
*Attorney, Agent, or Firm*—Kane, Dalsimer, Sullivan, Kurucz, Levy, Eisele and Richard

[57] ABSTRACT

To produce food possessing a meat-like texture with the texture, taste, and appearance similar to animal meat, bean curds (tofu and processed tofu) are used as raw material, and dehydrated to a water content of 60–70.1% before extruding from a food extruder.

2 Claims, No Drawings

PROCESSING TOFU OR DOUGH FOR PROCESSED TOFU TO RESULT IN MEAT-LIKE TEXTURE

CROSS-REFERENCE TO RELATED APPLICATION

This application is a continuation-in-part of copending U.S. Patent Application S.N. 878,319 filed Jun. 25, 1986 now abandoned.

BACKGROUND OF THE INVENTION

1. Field of the Invention

The invention relates to a method for producing food possessing meat-like texture, using soybean protein in the form of bean curds (tofu and processed tofu) as a raw material.

2. Background of the Invention

As processed foods, there are those obtained by pressing and dehydration of bean curds and addition of fats and oils or heat molding after a kneading treatment. Some of them have been commercialized under names such as "tofu steak", "tofu burger" and "cooking tofu". These products are similar to hard bean curds or "kamaboko" (boiled fish paste) in terms of texture and taste, but not similar to meat.

It is also known that fiber and granular texturized soybean protein is produced from defatted soybean flour, concentrated soybean protein or isolated protein by the extrusion cooking method, the water vapor granulation method or the spinning method. Patents relating to the methods mentioned are Patent Publication Nos. Sho-49-6665, Sho-50-25535, Sho-51-30140, Sho-5130141, Sho-53-12583, Sho-55-9179, Sho-55-18509, Sho-55-32341, Sho-565136 and Sho-57-5139. As described, these products are manufactured from defatted soybean flour or isolated soybean protein. Alkali, acid, and/or salts are added and in the processes of deodorization and decoloring, ethyl alcohol or hydrogen peroxide is added. Natural dextrin, animal protein paste, "wasabi" (horseradish) powder or mustard powder is added in order to enrich the flavor and processing fitness.

Although some of the granular and fiber (textured) soybean proteins produced as mentioned above possess a taste and texture similar to animal meat, many of them have poor flavor due to the various treatments. Therefore, it is difficult to supply soybean proteins as foods without further treatment or processing. They are used as an extender or a mixture additive for minced meat or animal meat at most. In addition, physical and chemical treatments such as degreasing and deodorization, take away from the original nutritious features of soybeans as vegetable foods.

As mentioned above, textured soybean proteins have poor flavor and therefore it is difficult to use them as food. They may require additional treatments such as water-swelling. In addition, many treatments of them degrade the original nutritious features of soybeans. Therefore, use of granular and textured soybean proteins are still limited by their poor flavor and physical properties.

The present invention provides a method for producing food rich in flavor and nutrition and possessing meat-like texture, from soybean protein.

SUMMARY OF THE INVENTION

The inventors found that it was advantageous to use bean curds (tofu and processed tofu) in an extruder to produce food products possessing a meat-like texture without the loss of soybean's original nutritious features and flavor. In a preferred embodiment, the bean curds (tofu and processed tofu) are dehydrated to water contents of 60–70.1%. Additives such as seasoning, condiments, coloring agent and spice, may be added. The curds are cooked and extruded from the die of an extruder. By the present invention, it becomes possible to produce food possessing a meat-like appearance with a taste and texture similar to animal meat, especially chicken meat, without degrading soybean's superior nutritious features.

DETAILED DESCRIPTION OF THE INVENTION

Bean curds (tofu and processed tofu) used as raw material in the present invention are what is called "bean curd" such as momen tofu and kinu tofu produced from soymilk by conventional methods; dough for deep fried bean curd ("aburaage"), roasted bean curd ("yakitofu"), and deep fried bean curd mixed with chopped vegetables ("ganmodoki"), and foods similar to bean curd which are obtained after coagulation and molding of reconstituted soymilk-like liquid prepared from whole soybean flour or isolated soybean protein. The term "processed tofu" as used herein means deep fried tofu, roasted tofu and deep fried tofu mixed with chopped vegetable. In the method according to the present invention, tofu or dough for processed tofu as defined above is used as raw material.

Generally, bean curds are prepared by coagulating soymilk obtained according to the conventional method, in which bean-curd refuses ("okara") is not contained, with the coagulant (for instance, magnesium chloride, magnesium sulfate, etc.), and molding. That is, in bean curds (tofu and processed tofu), cell wall contents which are considered to be the cause of browning and unpleasant odors are removed as bean-curd refuses in the processes of producing soymilk, and off-odors are also removed in the processes of pressing and/or soaking in cold water.

Bean curds mentioned above usually contain water (85–90%) and when they are treated by an extruder as they are, foods possessing meat-like texture cannot be produced. Therefore, it is necessary to dehydrate bean curds to water contents of 60–70.1%, for example by a hydraulic press machine or a steam drier before feeding them to an extruder.

These bean curds of water contents of 60–70.1% can be treated in an extruder directly and suitable additives such as seasoning, condiments, coloring agent, spice, etc. may be added to them. In addition, shrimp or seaweeds can be added depending upon the use of the products.

An extruder was first used for the purposes of dehydration and squeezing in 1800. With the invention of plastics, it came to be used in molding processes and recently it has been used for food processing also. Food extruders are mainly used for processing of powdered material, especially for puffing and molding, e.g. it is used for the production of snack foods.

There are single screw and twin screw extruders for foods, both of which can be used in the present invention.

A twin screw extruder shows superior properties for cooking of raw material with high water content or high viscosity, compared with a single screw extruder.

Its operating conditions can be controlled easily. Therefore, the twin screw extruder is the most suitable equipment to treat bean curds according to the present invention.

When dehydrated bean curds are treated in an extruder, a monopump is connected to the feed mouth of the extruder. Bean curds are fed into the extruder by this pump. "Extrusion cooking" i.e., cooking and kneading is carried out inside the barrel of the extruder and the resulting material is extruded through a die under atmospheric pressure. In this case, it is advantageous to perform heating at 120°-180° C. with a residence time of 80-160 seconds.

It is also advantageous to use a die of such structure as not to cause rapid puffing.

What is extruded from the die and possesses meat-like texture is then cut to a suitable length, and dried if necessary, to complete the product. What is extruded from a die can be used as food as it is, but it may be further processed by being cut smaller or molded depending upon the desired product.

The following example shows how important it is to treat dehydrated bean curds in an extruder in order to obtain food possessing a meat-like texture.

EXAMPLE 1

Momen tofu prepared by the conventional method was used, and the water content thereof was 85.5%. The momen tofu was squeezed by a hydraulic press machine to a water content of 77.7% and 70.1%. The bean curd of 70.1% in water content was then dried by a steam drum drier to prepare samples of dehydrated bean curds of 60.3, 50.2, 39.5, 30.3 and 20.2% in water content.

As an extruder, a CREUSOT-LOIRE BC-45 twin screw extruder was used.

Raw materials of 20-50% in water content were fed quantitatively to the extruder using a conventional powder feeder and a monopump, and raw material or more than 60% in water contents were fed quantitatively to the extruder using a monopump with a paddle feeder. Operating conditions of the extruder are shown in Table 1, below.

TABLE 1

| Feed rate | 20 kg/h |
|---|---|
| Screw rotating speed | 150 r.p.m. |
| Temperature in barrel | 150° C. |
| Size of die | 3 × 30 mm |
| Shape of die | flat |

TABLE 1-continued

| Residence time | 120 sec. |
|---|---|

The extrudate was cut in lengths of about 5 cm to evaluate the appearance, fibrousness, degree of texturization, taste and texture, organoleptically. The results are shown in Table 2 below. The symbols seen under the items of fibrousness, degree of texturization and taste and texture in Table 2 have the following meanings:
  ⊙ very good, ○ good, △ rather poor, X poor It is observed from the results shown in Table 2 that when bean curds of 50-80% in water contents were used, foods possessing meat-like texture were obtained and especially when those of 60-70% in water contents were used, foods possessing meat-like texture extremely similar to animal meat were obtained. In the cases where bean curds of less than 50% in water contents were used, products obtained lost their fibrousness and possessed a taste and texture completely different from that of animal meat. In the cases where bean curds of more than 80% in water content were used, the amount of water vapor blown out increased at the time of extrusion molding and therefore, it was difficult to obtain foods possessing a meat-like texture continuously and stably.

TABLE 2

|  | 1 | 2 | 3 | 4 | 5 | 6 | 7 | 8 |
|---|---|---|---|---|---|---|---|---|
| Water content | 20.2% | 30.3 | 39.5 | 50.2 | 60.3 | 70.1 | 79.7 | 85.5 |
| Appearance | flour-state | flour-state | seasoned fish powder-state | meat piece-state | meat mass-state | meat mass-state | minced meat-state | minced meat-state |
| Fibrousness | X | X | X | △ | ⊙ | ⊙ | ○ | △ |
| Degree of texturization | X | △ | △ | ○ | ⊙ | ⊙ | ○ | △ |
| Color | yellow brown | yellow brown | pale yellow | gray yellow | pale gray | pale gray | pale gray | pale gray |
| Taste & texture | X | X | X | ○ | ⊙ | ⊙ | ○ | △ |
| (meat-likeness) | none | none | none | dry meat-like | animal meat-like | animal meat-like | flexible minced meat-like | minced meat-like |

Food possessing a meat-like texture, obtained from bean curd of 70.1% in water content (which is shown in No. 6 in Table 2) was further cut to length and then deep fried.

An organoleptic test was carried out to evaluate texture, color, taste and texture. The food possessing meat-like texture was compared with cooked chicken meat (chicken nuggets). The results are shown in Table 3, below. These symbols seen in Table 3 have the following meanings:
  ⊙ very good, ○ good, △ poor

TABLE 3

|  | texture | color | taste & texture | taste |
|---|---|---|---|---|
| Chicken nugget (control) | ○ | ○ | ○ | ○ |
| Food possessing meat-like texture of No. 6 | ○ | ⊙ | ○ | ○ |

It is observed from Table 3 that food possessing a meat-like texture (No. 6) was not inferior to the chicken nuggets in taste and texture and rather superior in color.

The present invention solves the problem involved in the conventional method for producing textured soybean protein, where textured protein produced from conventional defatted soybean flour or separated soybean protein as raw material is obtained after various chemical and physical treatments for deodorization, decoloring, extraction and separation. By the present invention, food possessing a meat-like texture is superior both in flavor and nutrition and can be produced continuously.

In addition, one can use a large size extruder. Products obtained can be comparatively large in shape.

Moreover, such products as pieces of bean curd which do not have any commercial value, can be fully used in the present invention. Therefore, the invention has the additional effect of utilizing waste material.

EXAMPLE 2

200 kg of momen tofu was dehydrated by a hydraulic press machine and then dried by a steam drier to obtain about 80 kg of bean curd of 65% water content, which was used as raw material.

A CREUSOT-LOIRE BC-45 twin screw extruder was used. Raw material was fed to the extruder by a monopump. Treatment was carried out according to the operating conditions shown in Table 4, below.

TABLE 4

| | |
|---|---|
| Feed rate | 20 kg/h |
| Screw rotating speed | 150 r.p.m. |
| Temperature in barrel | 150° C. |
| Size of die | 3 × 30 mm |
| Shape of die | flat |

Food possessing a meat-like texture extruded from a die was cut at lengths of 5-7 cm to obtain a product of about 60 kg. Water content of the product was 60% and it possessed a meat-like taste and texture.

EXAMPLE 3

Dough prepared for deep fried bean curd ("abura-age") was subjected to a light press treatment to obtain a 72% water content. 80 kg of this was mixed and kneaded with about 8 kg of red shrimp processed on a high speed grinder to obtain 88 kg of raw material in total.

This raw material was subjected to extrusion treatment under the same conditions and by the same extruder described in Example 1. 62 kg of food possessing a meat-like texture was obtained. This product was an extremely superior meat analogue with the additional flavor of red shrimp.

What is claimed is:

1. A method for producing an edible food possessing a meat-like texture, which comprises: dehydrating tofu or dough for processed tofu selected from the group consisting of deep fried tofu, roasted tofu and deep fried tofu mixed with chopped vegetables to a water content of 60-70.1%; cooking the dehydrate in a twin screw extruder at 120°-180° C. with a residence of 80-160 seconds in the extruder; and extruding the cooked dehydrate from the extruder.

2. The method of claim 1 wherein the tofu or dough for processed tofu is dehydrated by use of a hydraulic press machine or a steam drier.

* * * * *